US009626522B1

United States Patent
Flowers, Jr.

(10) Patent No.: US 9,626,522 B1
(45) Date of Patent: Apr. 18, 2017

(54) METHOD AND APPARATUS FOR THE NETWORK STEGANOGRAPHIC ASSESSMENT OF A TEST SUBJECT

(71) Applicant: Robert Henry Flowers, Jr., Bristow, VA (US)

(72) Inventor: Robert Henry Flowers, Jr., Bristow, VA (US)

(73) Assignee: Robert H. Flowers

( * ) Notice: Subject to any disclaimer, the term of this patent is extended or adjusted under 35 U.S.C. 154(b) by 0 days.

(21) Appl. No.: 15/353,716

(22) Filed: Nov. 16, 2016

(51) Int. Cl.
*H04L 29/06* (2006.01)
*G06F 21/60* (2013.01)

(52) U.S. Cl.
CPC ............ *G06F 21/606* (2013.01); *H04L 63/02* (2013.01); *H04L 63/1433* (2013.01); *G06F 2221/033* (2013.01); *G06F 2221/034* (2013.01)

(58) Field of Classification Search
CPC ..... H04L 63/02; H04L 63/14; H04L 63/1408; H04L 63/1433; H04L 63/1441; H04L 63/1466; H04L 69/22; H04L 69/28; G06F 21/606; G06F 2221/033–2221/034
See application file for complete search history.

(56) References Cited

U.S. PATENT DOCUMENTS

| 7,356,599 | B2 | 4/2008 | Pochon et al. |
| 7,509,675 | B2 | 3/2009 | Aaron |
| 8,527,779 | B1 | 9/2013 | Easttom |
| 2009/0013074 | A1 | 1/2009 | Rice |
| 2013/0019106 | A1 | 1/2013 | Fischer |
| 2014/0254797 | A1 | 9/2014 | Piotrowska |

FOREIGN PATENT DOCUMENTS

| JP | 2011028703 A | 2/2011 |
| WO | 2016061742 A1 | 4/2016 |

OTHER PUBLICATIONS

Anjan et al., Design of Transport Layer Based Hybrid Covert Channel Detection Engine, IJASUC, vol. 1, No. 4, 2010.*
Cabuk et al., IP Covert Channel Detection, ACM, 2009.*
Zander et al., A Survey of Covert Channels and Countermeasures in Computer Network Protocols, IEEE, 2007.*

(Continued)

*Primary Examiner* — Minh Dinh (57) ABSTRACT

To date, there is no method to test the network steganographic effectiveness of network security hardware or software using a plurality of attack techniques. The invention specified herein represents such a method. The present invention enables an operator to test network security products in their ability to perform in areas including but not limited to detecting steganograms, preventing steganograms, normalizing packets transmitting covert data, steganographic operation without negatively impacting the performance/reliability of a network, and other activities related to network steganography. Assertions made by network security manufacturers with regard to their network firewall and security appliances must be supported by empirical evidence. The invention described herein provides quantitative and qualitative data to support or refute manufacturer assertions that their network security hardware or software can effectively perform as claimed as it relates to network steganography.

18 Claims, 3 Drawing Sheets

(56) References Cited

OTHER PUBLICATIONS

Jankowski, B., Mazurczyk, W., & Szczypiorski, K. (2011). Introducing inter-protocol steganography. Telecommunication Systems, 52, 1101-1111. doi:10.1007/s11235-011-9616-z.

Wendzel, S., Zander, S., Fechner, B, & Herdin, C. (2015). Pattern-based survey and categorization of network covert channel techniques. ACM Computing Surveys (CSUR), 47(3), 1-26. doi:10.1145/2684195.

Zieninska, E., Mazurczyk, W., & Szczypiorski, K. (2014). Development trends in steganography. Communications of the ACM, 57(3), 86-95. doi:10.1145/2566590.2566610.

\* cited by examiner

METHOD AND APPARATUS FOR THE NETWORK STEGANOGRAPHIC ASSESSMENT OF A TEST SUBJECT

CROSS-REFERENCE TO RELATED APPLICATIONS

This application claims the benefit of Provisional Patent Application No. 62/258,507 filed by the present inventor and titled, "A Steganogram Packet Sender/Receiver for the Assessment of Network Steganography Detection, Prevention, or Packet Modification Mechanisms" and is incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

TABLE OF CONTENTS

BACKGROUND OF THE INVENTION . . . 3
   Field of Invention . . . 3
   Description of Related Art . . . 3
BRIEF SUMMARY OF THE INVENTION . . . 9
   Description of the Invention . . . 9
   Benefits of the Invention . . . 9
BRIEF DESCRIPTION OF THE DRAWINGS . . . 12
DETAILED DESCRIPTION OF THE INVENTION . . . 12
   Components of the Invention . . . 12
   Operation of the Invention . . . 14
   Embodiments of the Invention . . . 16
CLAIMS . . . 19
ABSTRACT OF THE DISCLOSURE . . . 22

BACKGROUND OF THE INVENTION

Field of Invention

The invention specified herein relates to the field of network steganography. Herein, the term network steganography is defined as using normal network communication to conceal data inside transmissions.

Description of Related Art

The follow is a tabulation of some United States and international patents that presently appear relevant:

| Pat. No. | Issue date | Patentee | Title |
|---|---|---|---|
| U.S. 7,356,599 | Apr. 8, 2008 | Bastian Pochon, Paolo Scotton | Method and Apparatus for Data Normalization |
| U.S. 8,527,779 | Sep. 3, 2013 | William Easttom | Method and Apparatus of Performing Distributed Steganography of a Data Message |
| U.S. 7,509,675 | Mar. 24, 2009 | Jeffrey A. Aaron | Non-Invasive Monitoring of the Effectiveness of Electronic Security Services |
| JP 2011028703 | Feb. 10, 2011 | Morizumi Tetsuya | Security System Incorporated in Search System |

The follow is a tabulation of some United States and international patent applications that presently appear relevant:

| patent application No. | Pub. date | Patentee | Title |
|---|---|---|---|
| US 20140254797 | Sep. 11, 2014 | Agnieszka Piotrowska | Method and Filter for Erasing Hidden Data |
| US 20130019106 | Jan. 17, 2013 | Ronald Fischer | Method and Apparatus for Digital Steganography |
| US 20090013074 | Jan. 8, 2009 | William H. Rice | System and Method for Distributed Network Monitoring for Steganographic Messages |
| CN 2016061742 | Apr. 28, 2016 | Jianping Wang Rui Zhang Wen Qi | Automatic Profiling Framework of Cross-VM Covert Channel Capacity |

The following is a reference list of non-patent literature with authoritative information related to the present invention:

Jankowski, B., Mazurczyk, W., & Szczypiorski, K. (2011). Introducing inter-protocol steganography. *Telecommunication Systems*, 52, 1101-1111. doi:10.1007/s11235-011-9616-z Wendzel, S., Zander, S., Fechner, B., & Herdin, C. (2015). Pattern-based survey and categorization of network covert channel techniques. *ACM Computing Surveys (CSUR)*, 47(3), 1-26. doi:10.1145/2684195

Zielinska, E., Mazurczyk, W., & Szczypiorski, K. (2014). Development trends in steganography. *Communications of the ACM*, 57(3), 86-95. doi:10.1145/2566590.2566610

In preparation for a description of the present invention, the following terms will be defined and/or contextualized. The term network will be used to describe a shared digital medium used by a sender and a receiver to exchange data. The term packet will be used herein to generically refer to any unit of a network transmission including but not limited to frames, segments, or datagrams. The term overt refers to legitimate network data. The term covert describes surreptitious network data. A covert channel shall herein refer to the manipulation of packets that causes or has the effect of any one of the following:

a) Communicating data via a network such that the method of transfer is unconventional by the standard of the protocol being used to transmit said data (e.g., IETF RFC 791 [IP], IETF RFC 768 [UDP], or IETF RFC 793 [TCP], etc.);
b) Communicating data via a network such that it is transferred concurrently with overt data to the extent that the surreptitious transmission would be precluded but for the presence of the overt data;
c) Communicating data via a network such that the transfer of said data would not be noticed by one skilled in the area of network communications;
d) Communicating data via a network such that one skilled in the area of covert channels would consider the exchange generally unorthodox or explicitly covert.

The literature describes network communication consistent with the above characteristics as network steganography and a person skilled in that area as a network steganographer. The role of the network steganographer is distinct from the person who operates the invention described herein; thus, the entity using the invention in practice shall be referred to as the operator of the invention.

The output of a single steganographic method or a combination of methods shall be referred to herein as a steganogram. Herein, the singular term steganogram refers to an overt packet that has been altered or as a collective term describing a plurality of overt packets whose transmission method has been altered in order to manifest network steganographic communication. The process of embedding a covert message in an overt packet or altering the transmission of the overt packet to facilitate network steganographic communication shall be referred to herein as encoding. The reversal of that process which extracts the hidden message from the steganogram shall be referred to herein as decoding.

Any form of evaluation regarding the performance of a process, device, or algorithm in its ability to detect, prevent, correct, measure, alter the form of, alter the behavior of, characterize, or otherwise make judgments about steganograms shall be referred to herein as network steganographic assessment. The entity that is the subject of a network steganographic assessment, regardless of its specific configuration, shall herein be referred to as a test subject in the singular or test subjects in plural. A summative judgment as to how well or poorly a test subject performed during a network steganographic assessment shall be referred to herein as network steganographic effectiveness. Network steganographic assessments and the resulting judgments regarding network steganographic effectiveness can include but are not limited to the performance and reliability of the test subject during the assessment or the ability of the test subject to meet any other non-functional requirement of the operator with regard to network steganography.

Types of covert channels include methods that alter the protocol data unit (PDU) or header of a protocol to store a covert message or portion thereof. Such methods are referred to as storage channels. Another type of covert channel found in the related art is referred to as a timing channel. A timing channel is a method of covert communication that uses the deltas between packet times to encode data. A timing channel differs from a storage channel in that the former does not modify an overt packet to store covert data. The covert data is hidden from the network steganographer because a timing channel alters the normal transmission intervals of packets to manifest a covert channel. Parity channels use the state of a packet itself to encode data. For example, a packet with an odd checksum value could represent a 1 bit and a packet with an even checksum could represent a 0 bit. Sequence channels use the order of packets to encode covert data. For example, if numbered packets (e.g., packets enumerated using a TCP sequence number) have a predefined order of transmission, a deviation from the specified order could encode a 1 bit and conformance to the predefined order could represent a 0 bit.

Transmitting or receiving using a plurality of methods including but not limited to the aforementioned network steganographic methods to exchange a single covert message, portion of a covert message, or multiple covert messages shall be referred to herein as network steganographic integration. Evaluating the test subject using a plurality of methods is a critical feature of the invention because an entity wishing to develop defenses against network steganographic exfiltration would want such a defense to demonstrate its effectiveness against multiple steganographic exfiltration mechanisms. A defense that was effective against a single exfiltration method would still be vulnerable to a multitude of other methods. As such, the invention described herein enables an entity to optionally test a plurality of methods against a test subject. When using the invention described herein, the operator would select a group of network steganographic methods, evaluate the effectiveness of the test subject with regard to each of those methods, and continue until the test subject was evaluated against each method within the group. Network steganographic integration could also occur when the operator uses said group of methods to send a single message during the process of performing a network steganographic assessment. As such, any network steganographic assessment using a multi-method combination shall also be considered network steganographic integration.

The use of network steganographic integration manifested by the invention described herein is distinguished from the related art that uses intra-protocol and inter-protocol steganography referenced by Jankowski, Mazurczyk, and Szczypiorski (2011) by virtue of the fact that the current invention uses a plurality of steganographic methods in an evaluative context; whereas, the related art discusses the application of intra-protocol and inter-protocol methods without referring to an assessment of a test subject. Additionally, the intra-protocol and inter-protocol methods discussed by Jankowski et al. (2011) relate to exploitative use intended to lessen the probability of detection; whereas, the invention described herein relates to a broader set of concerns with regard to the performance of an entity by asserting its network steganographic effectiveness: which is not intended to enhance the covert nature of a multi-method attack. To the contrary, the invention described herein is intended to evaluate the ability of a test subject to counteract the surreptitious characteristics asserted by Jankowski et al. (2011).

The invention described herein is unique from the prior art by virtue of its focus on evaluating the network steganographic effectiveness related to the theft of data via exfiltration, its emphasis on the assessment of a monolithic test subject as opposed to an aggregated service, and its integrative features designed to expose the test subject to a wide variety of exfiltration algorithms. As such, the integrative and exfiltration-based approach of the present invention is distinct from the normalization countermeasures of Piotrowska (2014), the file block focus of Easttom (2013), the detective foci of Rice (2009) as well as Pochon and Scotton (2008), the inbound denatured position of Aaron (2009), and the preventative orientation of Fisher (2013).

BRIEF SUMMARY OF THE INVENTION

Description of the Invention

The invention described herein sends and receives steganograms via network steganographic integration for the purpose of conducting a network steganographic assessment to determine network steganographic effectiveness: how well a test subject is able to detect, prevent, correct, measure, alter the form of, alter the behavior of, characterize, or otherwise make judgments about steganograms. Such judgments also extend to the quality of operation of the test subject as it manifests the aforementioned behaviors.

BENEFITS OF THE INVENTION

The encoding and decoding operations of the present invention are performed using network steganographic integration. As previously described, the use of a plurality of methods enables the operator to evaluate the test subject against a variety of exfiltration methods; thus, ensuring a test subject is effective in a lab environment before implementation in a real world context. The lab provides the operator with a location were the assertions made by the manufacturers of the test subject can be empirically evaluated. The invention described herein can also be used to confirm network steganography equipment already deployed in production environments performs as expected. As manufacturers of test subjects continue to expand the functionality of their products, the operator can test each new exfiltration method. Additionally, risk mitigation strategies require an assessment of the threat environment. The network steganographic assessment features of the current invention enable an operator to determine how well the test subject responds to known threats. In the event the test subject fails to protect against the threat, the operator can plan other defense-in-depth risk mitigation measures. Without the capability of the current invention, the operator cannot know, unequivocally, which threats the test subject is capable of defending against. Currently, no multi-method evaluation mechanism is available to operators in need of network steganographic assessments.

An example of the critical need for network steganographic integration would be an embodiment of the invention descried in the patent application by Piotrowska (2014). Recall, the inventor described a device that could remove covert payloads from packets; thus, preventing network steganographic transfer. A manufacturer of a device that acted as the preferred embodiment in the patent application by Piotrowska (2014) would serve as a test subject for the current invention because it purported to defend against a plurality of network steganographic attacks. A study of network steganographic methods in 2015 found that there were 109 different methods of attack available to those who wished to exfiltrate data (Wendzel et al., 2015). As such, an implementation of the current invention that evaluated the network steganographic effectiveness of a test subject against a single method would require an operator to conduct 109 different tests.

A solution that required one test operation per method would be suboptimal from a time and effort perspective. If, for example, an operator wished to evaluate a test subject against 20 different variants of timing channels, 20 variations of header-based attacks, and 10 variations of sequence channel attacks they would have to run 50 individual tests using a single-method based test operation; however, with an instance of the current invention and its use of network steganographic integration, that same operator could run a single test and the current invention would perform evaluations of a plurality of network steganographic methods. The current invention would then output holistic results in the form of a single network steganographic assessment by reporting the test subject's performance against many different attacks. The one-to-many relationship between a single test (from the operator's perspective) and a plurality of network steganographic methods offers a benefit to operators in the form of efficiency and comprehensive evaluation.

To date, no solution exists for operators wishing to quantify the impact a test subject has upon the reliability of normal network communications. The preventative, detective, or corrective controls manifested by a test subject could have a negative impact on the flow of network traffic it purports to protect. The evaluation of that impact is within the scope of the aforementioned determination of network steganographic effectiveness offered by the present invention. For example, there exists no method for determining the network steganographic effectiveness of a test subject purporting to maintain the fidelity of a communications channel when its anti-network steganographic defenses are enabled. Using the invention described herein, an operator could evaluate both the ability of a test subject to detect/prevent/normalize exfiltration as well as how such a test subject impacts the reliability of the overt communications channel. Consistent with the last tenet of the cybersecurity triad (i.e., confidentiality, integrity, and availability), the implementation of an anti-network steganography test subject should not degrade the availability of the communications channel it is intended to protect. As such, the present invention enables the operator to ensure all three components of the triad are intact with regard to the evaluation of a test subject.

Similar to the absence of a method to assess the impact a test subject has upon reliability, there exists no method to evaluate the performance impact of an anti-network steganographic test subject. Some security devices can impose delays in the transfer of packets from source to destination. For example, latency is a byproduct of the processor-intensive nature of encryption used to implement the secure sockets layer (SSL) and transport layer security (TLS) used in modern web browsers and secure web sites. Similarly, the addition of covert data to an overt packet requires the calculation of new checksums as well as packet data reordering which also results in additional overhead. Similar to evaluating the channel reliability impact of a test subject, quantifying the performance impact of such operations falls within the scope of network steganographic assessment performed by the invention described herein.

BRIEF DESCRIPTION OF THE DRAWINGS

The invention is illustrated in three flow charts using the Business Process Modeling Notation (BPMN) international standard in FIG. 1, FIG. 2, and FIG. 3. Within each process model, the label of each lane containing a component of the invention claimed herein is preceded by a sequence number [1-15]. Lanes without numbers represent entities that provide input to, receive output from, or are tested by the invention.

DETAILED DESCRIPTION OF THE INVENTION

Components of the Invention

Figure 1:
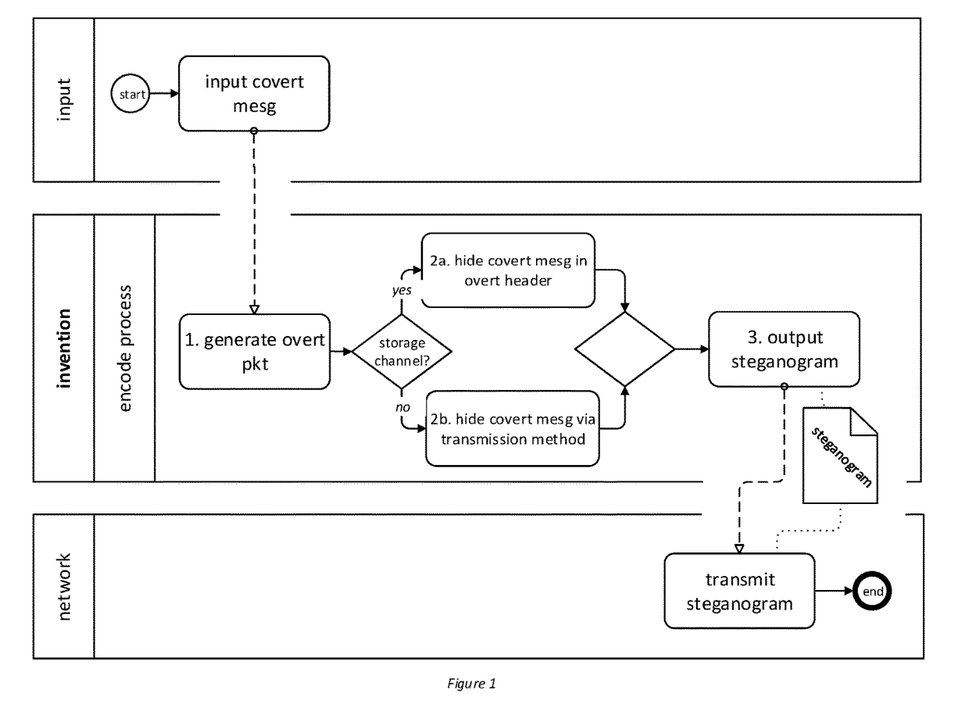
FIG. 1: Process model illustrating the sending component of the invention and associated, but not integral, input and outputs.

In Step 1 of FIG. 1, the encoder accepts the covert message that is to be encoded in a steganogram. The entity that provides the input could consist of (but is not limited to) keyboard input by the operator of the invention, data read from a disk, data read from a database, or a similar source. Once the input is accepted by the encoder, the encoding process begins. First, the encoder generates the overt network packet in Step 1. The packet generation process continues by hiding the covert message according to a method selected by the operator of the invention. Such methods are numerous and varied in type. If, as illustrated in Step 2a, the operator of the invention selected a storage channel, the encoder will hide the covert message, or portions thereof, in the protocol data units (PDU) or headers of one or more of the selected protocols. If the operator chose a timing channel, as illustrated in Step 2b, the invention will encode the covert message by altering the transmission times of the overt packets as a method of establishing a covert channel between the sending component and the receiving component of the invention.

Regardless of whether the operator of the invention chooses to hide the covert message using a single method or multiple concurrent methods, the encoder will hide the covert message according to the operator's selection. If the storage channel method was selected, the packet is now referred to as a steganogram because it contains both the overt packet and a portion of the hidden message. As previously stated, if the covert method selected was not storage based (e.g., timing channel, parity channel, sequence channel, etc.), the group of packets surreptitiously manipulated to transmit the hidden communication will collectively represent a steganogram. As illustrated in Step 3, once the encoding process completes, the encoder passes the steganogram to the network interface of the local computer for transmission on the network interface used to move network data from the sender to the receiver. For example, on a modern general purpose operating system, such an interface could be presented to the invention in the form of an application programming interface (API) called a socket.

Figure 2:
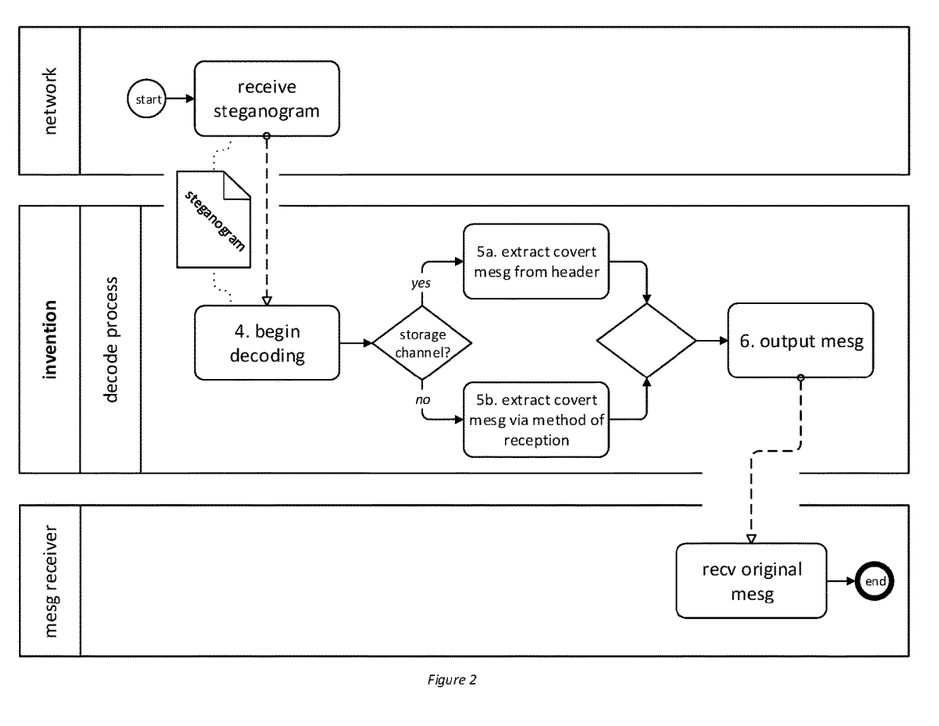
FIG. 2: Process model illustrating the receiving component of the invention and associated, but not integral, inputs and outputs.

The second component of the invention, the receiving process, is illustrated in FIG. 2. The receiving process operates on the second computing device connected to a network which enables it to receive packets from the sending component of the invention illustrated in FIG. 1. Depending upon embodiment, the network interface of the receiving computing device is not always a component of the invention. It serves as a hardware or software interface (again, depending upon the embodiment of the invention) that enables the invention to receive steganograms. Upon receipt of the steganogram transmitted by the sending component of the invention, the decoding process of the invention in FIG. 2, Step 4 will identify the method used by the encoding process to encode the hidden message. The identification could occur as a result of pre-configuration or it may occur dynamically during the receiving process. For example, if the type of network steganography used to encode the hidden message is a storage channel, the decoding process could self-identify the specific sub-method (e.g., ID field payload, TOS field payload, etc.) based upon a sub-method type value stored in a predetermined field.

Once the decoding component of the invention in Steps 5a and 5b of FIG. 2 identifies the method of encoding, it will perform message extraction; thus, restoring the message to its form prior to network steganographic encoding by the sending component of the invention in FIG. 1. For example, if the method used to encode the covert message was a storage channel, the decoder would execute Step 5a by retrieving the covert message from a predetermined location in the PDU of the steganogram. If the method of network steganographic encoding was a timing channel, the decoding process in Step 5b would use delays in packet reception times to decipher the encoded message and restore the state of the message to its original form prior to network steganographic encoding. Regardless of the use of a storage channel, timing channel, parity channel, sequence channel, or any other form of covert channel the decoding process may use a single steganogram or a plurality of steganograms to receive each message or portions thereof. Subsequent to decoding, the decoder presents the restored covert message to the receiver during Step 6. At this point, the message was covertly transferred from sender to receiver and the surreptitious transfer is complete.

Operation of the Invention

Figure 3:
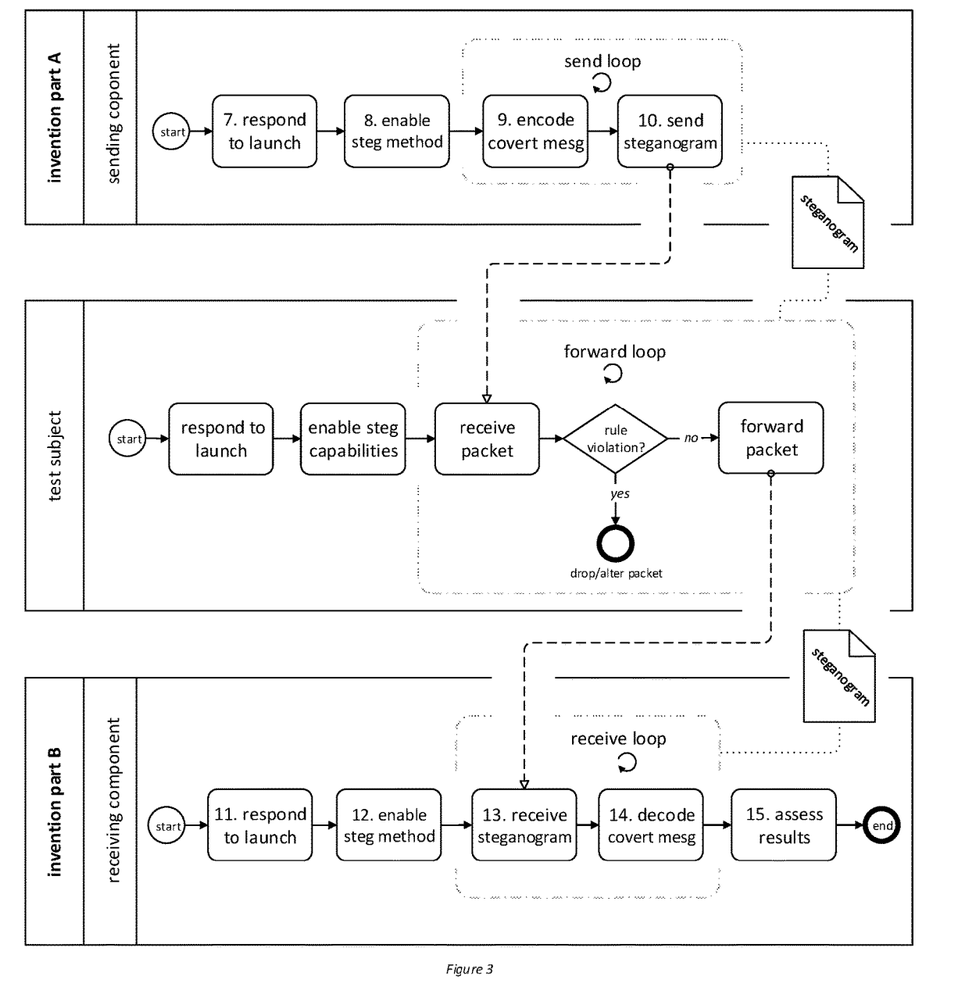
FIG. 3: Process model illustrating the operation of the invention by an operator with regard to evaluating a test subject using the sending and receiving components of the invention.

The purpose of FIG. 3 is to demonstrate the operation of the sending component and the receiving component of the invention described herein. The person conducting the network steganographic assessment of the test subject using the invention is the aforementioned operator. To assess the test subject, the operator of the invention first launches the sending component of the invention so that it is ready to transfer packets to the receiving component. In Step 7, the sending component of the invention responds to the operator's request for it to begin operation. In Step 8, the invention uses the method or group of methods the operator selected to initiate the transfer of the covert data. Step 9 illustrates how the sending component of the invention embeds the covert message in the overt message to form a steganogram. In Step 10, the sending component of the present invention is ready to begin transmitting steganograms to the receiving component of the present invention. Next, the operator of the invention connects the test subject to networks that facilitate packet transfer between the sending component and the receiving component. The steps within the test subject are not delineated because they are not a component of the present invention; however, the operator configures the test subject such that it has its steganographic capabilities enabled.

As illustrated in Step 11, the receiving component of the present invention responds to the operator's request to begin operation. In Step 12, the receiving component prepares to accept steganograms using the steganographic method selected by the operator. In Step 13, the receiving component is ready to begin receiving steganograms and to decode them in Step 14 to extract the original covert message. At the conclusion of the receiving loop, Step 15 shows the process of analyzing the steganograms transferred from sender to receiver: specifically, the performance of the test subject during testing. The focus of the operator of the invention will be on three loops in FIG. 3. The send loop, consisting of Steps 9-10, which continuously transmits packets to the test subject. The forward loop of the test subject is the second important loop. The test subject forward loop applies a filtering rule set to determine which packets it should forward and, if said packets are steganograms, which it should drop, modify, or normalize. The receive loop, consisting of Steps 13-14, accepts steganograms and extracts the hidden message from each steganogram it receives.

The outcome of FIG. 3, as observed by the operator of the invention, can take many forms. In the context of prevention, one outcome is that the test subject drops (i.e., does not forward) the steganogram because it is an element of a covert channel. The test subject could also repackage the protocol data such that hidden data is effectively stripped from the steganogram by reformatting the steganogram into a normal packet. If the test subject drops the packet, the operator of the invention will not observe its arrival at the receiving component in Step 13. In the case of a reformatted packet, the overt data arrives, but the covert data does not. Another form of effective intervention is for the test subject to alter the timing of the steganograms such that a timing channel is disrupted. Regardless of the specific disruptive operation, the operator of the invention will observe an absence of covert data at the point of reception if the intervention by the test subject is successful. In response to the change in state of the covert data and as a result of intervention(s) by the test subject, the invention described herein will output data that enables the operator to determine the network steganographic effectiveness of the test subject.

As it relates to the specific positioning of the test subject, network steganographic assessment is independent of test subject placement. FIG. 3 is an illustrative example of one of many placements of a test subject. Therefore, it is not necessary for the entity being evaluated to be positioned between the sending and receiving components of the invention described herein. A network steganography detection solution, for example, could be configured such that it receives a copy of all traffic on a network segment. In that position, the test subject could alert based upon the presence of steganograms. As a result, the test subject's claim of network steganographic effectiveness would be based upon its ability to receive a copy of the source steganogram as opposed to direct interception of original steganograms. Such an implementation would be consistent with the evaluative process described herein because what is claimed is the process of network steganographic assessment for the purpose of determining network steganographic effectiveness, not the specific configuration or operating characteristics of a test subject.

EMBODIMENTS OF THE INVENTION

Given the plurality of methods that can be applied using the network steganographic integration features of the present invention, there are numerous combinations available for an embodiment. Regardless of combination, elemental network steganography methods of embodiments include but are not limited to storage channels, timing channels, sequence channels, and parity channels. Other embodiments of the invention include but are not limited to variants that split the invention into two independent but cooperating components. An embodiment of the split variety could, for example, be represented as an encoding component (see FIG. 1, Steps 1-3) and a separate decoding component (see FIG. 2, Steps 4-6). In that arrangement, an embodiment may consist of separately compiled executables from the same source code base or different code bases so long as both components used a commonly understood communication mechanism. Embodiments of the encoding and decoding components could also take a variety of forms including but not limited to hardware, a virtual machine, or a dedicated security appliance.

In contrast to a dedicated single-mode encode or decode function, another embodiment of the present invention could offer multi-mode capability such that a single executable is capable of operating as an encoder or a decoder of steganograms. An operator could invoke such an embodiment with a special command that tells the executable to operate in encode versus decode mode, or the multi-mode operation could be the result of a configuration change via an input: including but not limited to keyboard, file, or database configuration data. Such a dual mode capable embodiment could also make the determination of encode versus decode mode as a result of run-time instructions or contextual queues that instruct it to operate in encode mode or decode mode. Similar to the split encoder and decoder, an embodiment in the form of a multi-mode mechanism could also take a variety of forms including but not limited to a hardware component, virtual machine, or dedicated security appliance.

Embodiments of the invention further include but are not limited to variants that modify existing overt packets or those that automatically generate overt packets. An embodiment of a type that modifies existing overt packets could intercept packets as they travel from source to destination, modify the contents or method of transfer of said packets to include a steganographic payload, and output a steganogram. Such traffic could be received by the steganographic encoder as it traverses a network or as it moves through a network stack on a single host as part of protocol encapsulation. Another embodiment, of the automated variety, might take the form of a method that creates overt packets from scratch. The output of an automatic overt packet generation method shall be referred to herein as synthetic packets or synthesized packets. Such a method could create the overt packet first or it could synthesize the creation of the overt packet and covert payload as a single operation.

Additional embodiments of the invention include but are not limited to those that accept alternate forms of covert message input. When evaluating a test subject, an embodiment could be implemented to encode a covert message that already exists. For example, an embodiment could accept as input a covert message received from a keyboard, file, database, or other form of interface that presents the covert message to the encoder. Conversely, an embodiment could automatically generate covert messages to eliminate the need for the operator to specify such a covert message. As part of a network steganographic assessment of a test subject, an embodiment could leverage auto-generated data to enable the receiving agent to make predictions about traffic it expects based upon previous traffic it has received. The Transmission Control Protocol (TCP) of the Internet Protocol (IP) used on the World Wide Web (WWW) applies this method specifically to calculate retransmission times in an effort to guarantee delivery of segments. An embodiment of the invention described herein could use a similar method to establish the reliability of a test subject when it does not receive a steganogram, receives an improperly sequenced steganogram, or experiences other transfer anomalies.

Embodiments of the invention could also operate on hosts in a variety of forms. Such forms include but are not limited to those that are physical or virtual. As it relates to a virtual host, an instance of the sender or receiver can operate on a virtual host that is itself instantiated by a hypervisor. Such implementations are considered embodiments regardless of architecture, model type, or manufacturer. An embodiment can, as a precursor to encoding, further include a step that accepts input of the covert message from a specific source or group of sources. Such sources include but are not limited to a keyboard, files on disk, files in memory, redirected command line input, databases, or any other method of accepting input for the encoder. An embodiment can also further include a step that writes the results of a network steganographic assessment to an output. Such an embodiment could take many forms including but not limited to writing the quantitative and/or qualitative outcomes of the assessment to an output screen, file, or database. As part of a network steganographic assessment, an embodiment could further include a step that writes the output of the decoder (i.e., the original covert message) to an output including but not limited to a screen, file, or database.

I claim:

1. A method of evaluating a network entity comprising:
   (a) providing computing hardware with a network interface that enables data transmission from a sending agent;
   (b) providing computing hardware with a network interface that enables data reception for a receiving agent;
   (c) providing a test subject asserting efficacy related to steganograms;
   (d) providing a network interconnecting said sending agent to said receiving agent;
   (e) selecting two or more covert channels from a group of covert channels for network steganographic integration;
   (f) encoding a covert message within an overt packet to create a steganogram using said network steganographic integration;
   (g) transmitting said steganogram from the sending agent to the receiving agent;
   (h) decoding said steganogram using said network steganographic integration to extract said covert message; and
   (i) executing a network steganographic assessment of said test subject based on said decoding, whereby an operator determines the network steganographic effectiveness of said test subject.

2. A method of claim 1 wherein said network steganographic integration uses a storage channel to complete said network steganographic assessment.

3. A method of claim 1 wherein said network steganographic integration uses a timing channel to complete said network steganographic assessment.

4. A method of claim 1 wherein said network steganographic integration uses a sequence channel to complete said network steganographic assessment.

5. A method of claim 1 wherein said network steganographic integration uses a parity channel to complete said network steganographic assessment.

6. A method of claim 1 wherein the functional role of said sending agent is limited to transmitting and not receiving said steganograms.

7. A method of claim 1 wherein the functional role of said receiving agent is limited to reception and not transmission of said steganograms.

8. A method of claim 1 wherein said sending agent can also operate, via a configuration change, as said receiving agent.

9. A method of claim 1 wherein said receiving agent can also operate, via a configuration change, as said sending agent.

10. A method of claim 1 wherein said overt message is pre-existing.

11. A method of claim 1 wherein said overt message is synthesized.

12. A method of claim 1 wherein said covert message is pre-existing.

13. A method of claim 1 wherein said covert message is synthesized.

14. A method of claim 1, further including reading the covert message to be encoded as a steganogram from an input.

15. A method of claim 1, further including writing the output of the network steganographic assessment to an output.

16. A method of claim 1, further including writing the original covert message that was decoded from a steganogram to an output.

17. A method of claim 1 further including evaluating the performance impact of a test subject.

18. A method of claim 1 further including evaluating the reliability impact of a test subject.

* * * * *